Dec. 15, 1931.  E. A. SPERRY, JR  1,836,881
FLIGHT PANEL
Filed March 22, 1930
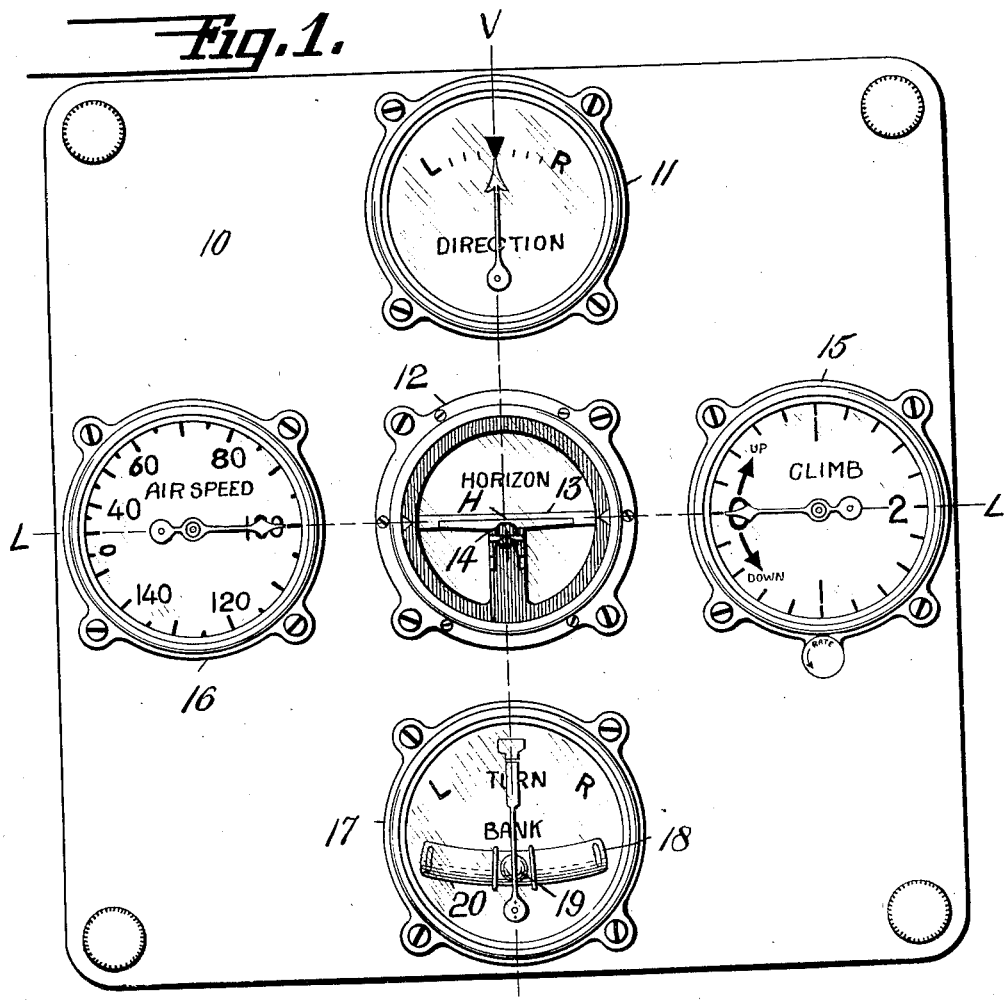
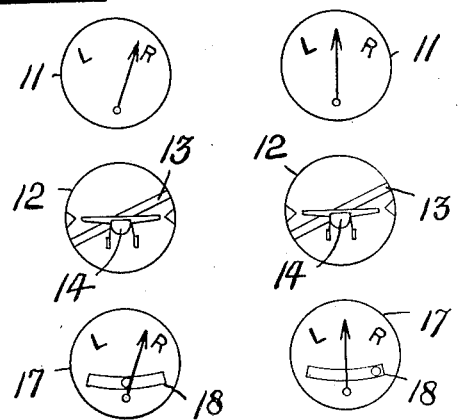
INVENTOR
ELMER A. SPERRY, JR.
BY
Herbert L. Thompson
his ATTORNEY.

Patented Dec. 15, 1931

1,836,881

UNITED STATES PATENT OFFICE

ELMER A. SPERRY, JR., OF BROOKLYN, NEW YORK, ASSIGNOR TO SPERRY GYROSCOPE COMPANY, INC., OF BROOKLYN, NEW YORK, A CORPORATION OF NEW YORK

FLIGHT PANEL

Application filed March 22, 1930. Serial No. 438,037.

This invention relates to a flight panel, that is, an instrument board for aircraft. It is understood that modern aircraft employ several panels carrying various instruments, but the flight panel is the instrument board directly in front of the pilot and which is utilized by him throughout the flight of the craft. My invention relates to an arrangement of flight instruments on the flight panel such that the sets of instruments cooperate to give unitary indications of movements of the craft around several axes. More particularly the sets of instruments are arranged along two axes, one representing the lateral axis of the craft and another representing the combined vertical and longitudinal axes.

It is a further object of my invention to arrange the sets of instruments on the flight panel along predetermined axes which bear the same relation to the pilot as the axes of the aircraft. This will establish a natural relation between the pilot and the instruments which will enable the pilot to ascertain his position quickly without the necessity for calculations or mental adjustments in order to orient himself with respect to the craft.

Further objects and advantages of this invention will become apparent in the following detailed description thereof.

In the accompanying drawings,

Fig. 1 is a front elevation of a flight panel having the sets of instruments arranged in accordance with my invention.

Figs. 2 and 3 are diagrammatic views showing the coaction of the sets of instruments along the combined vertical and longitudinal axes.

Fig. 4 is a diagrammatic representation showing the coaction of the instruments along the lateral axis.

Referring to Fig. 1 of the drawings, I have shown a flight panel including the board 10 which is mounted in front of the pilot and which supports the various flight directing instruments. These instruments are shown as comprising an azimuth compass 11 which may be magnetic, gyroscopic, earth inductor, or any other type of direction indicator; an artificial horizon 12 in which a member 13 is held fixed as by a gyroscope in the Sperry artificial horizon, while an index in the form of an aircraft 14 on the dial moves with the craft; a rate of climb indicator 15 of the usual type; an air speed indicator 16 which may also be of an ordinary design; and a turn indicator 17 which may also combine therewith a banking indicator 18. The said banking indicator may be a well known form, such as a ball 19, operating in a tube 20 so that when the aircraft banks in going around a turn, the ball would tend to roll down into the low end of the tube were it not for the centrifugal force of turning which throws the ball outwardly to move it back toward the center of the tube. When the banking angle is correct, the ball will retain its central position. All these instruments are well known separately except the artificial horizon which is described in detail in my copending joint application with Preston R. Bassett No. 365,460, filed May 23, 1929, for flight indicators.

It will now be seen that I have arranged these instruments with respect to three axes: the lateral axis L—L along which are positioned the air speed indicator, the artificial horizon and the rate of climb indicator; the axis V—V representing the vertical axis, along which are arranged the compass, artificial horizon and turn indicator and bank indicator; and the intersection of these axes at H, which represents the longitudinal horizontal axis of the craft perpendicular to the plane of the paper.

Movements of the craft about the lateral axis L—L results in ascending or descending movements of the craft, and it will now be seen that the three instruments arranged along the axis L—L, that is the air speed indicator, artificial horizon, and rate of climb indicator all respond to such ascending or descending movements of the aircraft. It will be evident that if, for example, the craft starts descending that the air speed will increase, the index 14 will move below the artificial horizon 13 and the rate of climb indicator will indicate downward movement. This condition is shown diagrammatically in Fig. 4 where the co-action of the three indicators to yield the unitary indication of descent is made apparent. If any one of these three instruments moved from the position shown in Fig. 1, which indicates level flight, to the position indicated in Fig. 4, it would not of itself be sufficient to indicate descending movement of the craft. Such indication would only indicate temporary fluctuations in that particular instrument which would have no significance, and the pilot would be in error in operating the controls of his craft to correct the condition which any one of these instruments alone indicate. It is only when all three of these devices co-act to indicate descent or ascent of the craft that the pilot is justified in operating the controls in response thereto. It will, of course, be understood that when the plane is ascending, the opposite set of indications from that disclosed in Fig. 4 will be obtained, that is, the index 14 will be above the horizon 13 and the air speed and rate of climb indicators will operate from the central positions shown in Fig. 1 in directions opposite to those shown in Fig. 4. The pilot thus has a group of co-operating instruments set in exactly the same position with respect to the axis L—L as he himself is positioned with respect to the lateral axis of the craft and upon the joint indication of these three instruments he has a natural position with respect to the craft for righting the condition indicated.

Similarly, a set of instruments is arranged along the vertical axis V—V for indicating turning of the craft in azimuth. Since the type of compass 11 may be sluggish in its action, it is supplemented by the turn indicator 17 which responds quickly to deviations from a given course, that is, to turning around the vertical axis, and since such turning movements are always accompanied by bank, the artificial horizon will indicate this condition by the relative turning of index 14 with respect to artificial horizon 13. Thus, for example, in Fig. 3, there is illustrated diagrammatically a turning movement around the axis V—V toward the right. The compass 11 indicates movement toward the right, the turn indicator 17 indicates movement toward the right and the artificial horizon 12 indicates that the plane is banked in the proper direction, that is, with the right wing low and the left wing high with respect to the horizontal 13, and the bank indicator 18 indicates that the craft is banked the proper amount because the ball rests in the center of the tube. In other words, all four instruments have co-acted to give a single unitary indication of a turn in a given direction. If any one of these instruments indicated without the others it would indicate to the pilot that there was no turning but only some temporary deviation of that instrument.

The set of instruments arranged along the vertical axis V—V not only indicates movements around said axis but indicates also movements around the longitudinal horizontal axis of the craft and distinguishes the latter movements from the turning movements in azimuth. Thus, for example, in Fig. 2 there is shown diagrammatically the condition wherein turning occurs only around the longitudinal axis H, that is, there is lateral tilting of the craft without turning in azimuth. This is indicated by the artificial horizon 12 while the compass and turn indicator indicates no deviation. The bank indicator also indicates that there has been no turning because the banking has merely caused the ball to roll to the lower end of the tube, whereas had there been turning with banking the ball would have remained in the center of the tube as in the case shown diagrammatically in Fig. 3.

It will be seen from the above description that I have disclosed two sets of instruments which co-act to give unitary indications about three distinct axes and further that the instruments are arranged so that said axes bear the same relation to the pilot as axes of the aircraft, thus giving said instruments a natural positioning with respect to the pilot.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. A flight panel for aircraft having an air speed indicator, an artificial horizon, and a rate of climb indicator mounted therein, all of said instruments cooperating to give a unitary indication of pitching movements of the craft about a lateral axis, said instruments being arranged on said panel in a horizontal line, and the index of each being in alignment for normal uniform flight and moving in a like apparent direction for normal descent or ascent of the craft but unlike for an unnatural or dangerous attitude of flight.

2. A flight panel for aircraft having a direction indicator, an artificial horizon, and a turn indicator mounted therein, all of said instruments cooperating to give a unitary indication of turning movements of the craft about a vertical axis, said instruments being arranged on said panel in vertical alignment and the index of each showing similar angles to the vertical for normal banked turning and being in line with or perpendicular to said vertical line for normal straight flight but being at unlike angles for incorrect attitude of flight.

3. A flight panel for aircraft having a direction indicator, an artificial horizon, a turn indicator, an air speed indicator, and a rate of climb indicator mounted therein, said direction indicator, artificial horizon, and turn indicator being arranged vertically with the artificial horizon in the middle and cooperating to give a unitary indication of turning movements of the craft about a vertical axis, and said air speed indicator, and rate of climb indicator being arranged and in line horizontally on the two sides of said artificial horizon and all cooperating to give a unitary indication of turning movements of the craft about a lateral axis.

4. A flight panel for aircraft having a direction indicator, an artificial horizon, a turn indicator, a bank indicator, an air speed indicator, and a rate of climb indicator mounted therein, said direction indicator, artificial horizon, bank indicator and turn indicator being arranged in vertical alignment with the artificial horizon in the middle, thereby cooperating to give a unitary indication of turning movements of the craft about a vertical axis, and said air speed indicator, artificial horizon, and rate of climb indicator being arranged in horizontal alignment with said artificial horizon in the middle, thereby cooperating to give a unitary indication of turning movements of the craft about a lateral axis.

In testimony whereof I affix my signature.

ELMER A. SPERRY, Jr.